United States Patent Office 2,859,224
Patented Nov. 4, 1958

2,859,224

HALOGENATED COMPOUNDS FOR SYNTHESIZING STEROIDS

Martin W. Farrar, Webster Groves, Harold Raffelson, St. Louis, and William S. Knowles, Kirkwood, Mo., assignors to Monsanto Chemical Company, St. Louis, Mo., a corporation of Delaware No Drawing. Original application July 23, 1953, Serial No. 369,944, now Patent No. 2,759,929, dated August 21, 1956. Divided and this application June 21, 1956, Serial No. 592,729

10 Claims. (Cl. 260—397.45)

This invention relates to methods and novel compounds of the cyclopentanodimethylpolyhydrophenanthrene series having a 3-keto group and a double bond in the 4,5 position, which compounds are intermediates in proceeding from a 17-formyl-cyclopent-16-eno-10,13-dimethyl - $\Delta^{4,9(11)}$ - decahydrophenanthren - 3 - one to a 17-(acyloxyacetyl) - 17 - hydroxy - cyclopentano - 10,13-dimethyl - $\Delta^4$ - dodecahydrophenanthren - 3,11 - dione. In particular this invention relates to methods and novel compounds useful in the preparation of acyl derivatives of 3,11,20-triketo-17,21-dihydroxy-$\Delta^4$-pregnene from a 3-keto-17-formyl-$\Delta^{4,9(11),16}$-androstatriene.

The sequence of steps or series of reactions proceeding from a 17-formyl-cyclopent-16-eno-10,13-dimethyl-$\Delta^{4,9(11)}$-decahydrophenanthren-3-one to a 17-(acyloxyacetyl) - 17 - hydroxycyclopentano - 10,13 - dimethyl-$\Delta^4$ - dodecahydrophenanthren - 3,11 - dione essentially comprises (1) epoxidizing a 17-formyl-cyclopent-16-eno-10,13 - dimethyl - $\Delta^{4,9(11)}$ - decahydrophenanthren - 3-one with an oxygen furnishing agent, (2) converting the formyl group of the 16,17-oxido compound so formed to a carboxyl group, (3) reacting the carboxylic acid so obtained with an acyl halide forming agent, (4) reacting the resultant acid halide with diazomethane, (5) reacting the diazo-ketone so formed with a carboxylic acid to form a 17-(acyloxyacetyl)-16,17-oxido-cyclopentano-10, 13-dimethyl-$\Delta^{4,9(11)}$-decahydrophenanthren-3-one, (6) reacting said latter compound with a hydrogen halide, (7) reacting the 16 - halo - 17 - hydroxy - 17 - (acyloxyacetyl) - cyclopentano - 10,13 - dimethyl - $\Delta^{4,9(11)}$ - decahydrophenanthren-3-one so formed with a hypohalous acid, (8) oxidizing the 9,16-dihalo-11,17-dihydroxy-17- (acyloxyacetyl) - cyclopentano - 10,13 - dimethyl - $\Delta^4$-dodecahydrophenanthren-3-one with a complex of chromium oxide and a tertiary amine, (9) de-halogenating the 9,16-dihalo-17-hydroxy-17-(acyloxyacetyl)-cyclopentano - 10,13 - dimethyl - $\Delta^4$ - dodecahydrophenanthren-3,11-dione so as to produce a 17-acyloxyacetyl)-17-hydroxy-cyclopentano-10,13 - dimethyl - $\Delta^4$ - dodecahydrophenanthren-3,11-dione. The aforesaid sequence of steps is outlined schematically as follows:

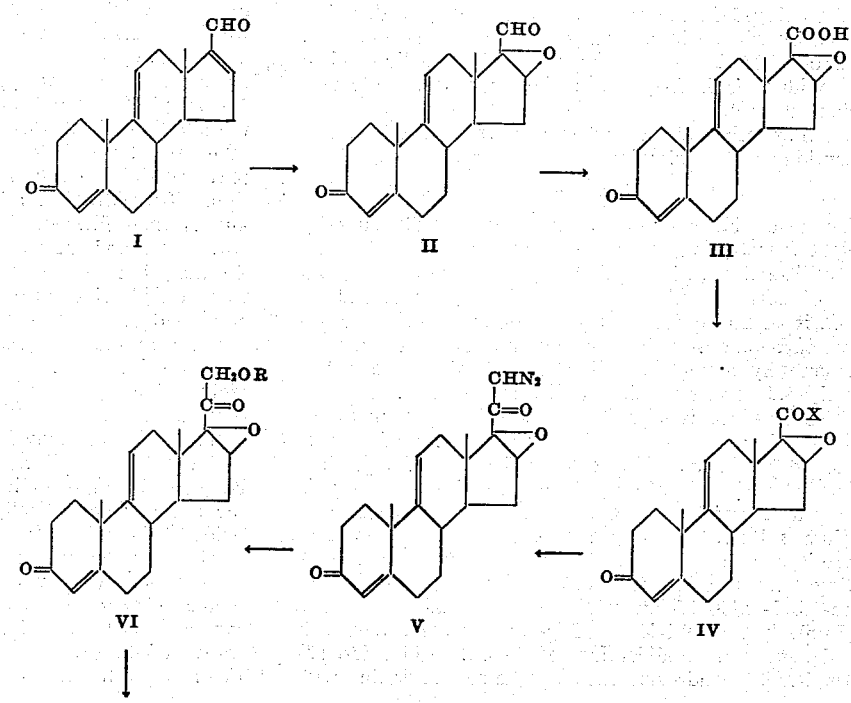

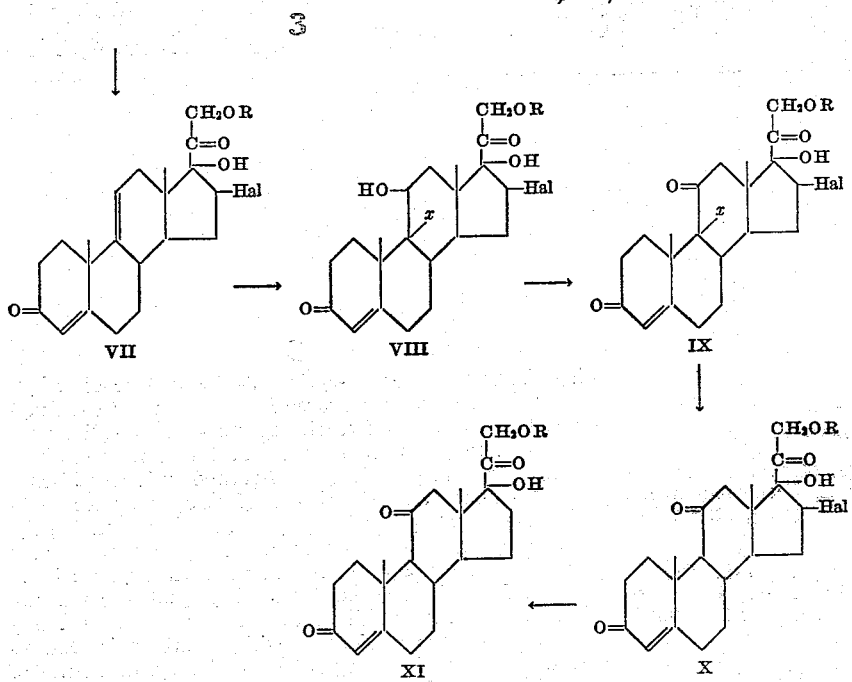

This invention will be described in detail with respect to its preferred embodiment but it is to be understood that such is not limitative of this invention.

The first step in the process of this invention is the epoxidation of a 17-formyl-cyclopent-16-eno-10,13-dimethyl - $\Delta^{4,9(11)}$ - decahydrophenanthren - 3 - one to a 16,17 - oxido - 17 - formyl - cyclopentano - 10,13 - dimethyl - $\Delta^{4,9(11)}$ - decahydrophenanthren - 3 - one (Compound II) employing an oxygen furnishing agent such as the organic per-acids or hydrogen peroxide in an amount corresponding to approximately one chemical equivalent. The epoxidation is ordinarily carried out by mixing the oxidant and the 17-formyl-cyclopent-16-eno-10,13-dimethyl-$\Delta^{4,9(11)}$-decahydrophenanthren-3-one together in an organic medium which is non-reactive under the reaction conditions. Suitable media include chloroform, carbon tetrachloride, diethyl ether, glacial acetic acid, methanol, ethanol, isopropanol, and the like. The temperature employed in the epoxidation may vary widely but ordinarily will be in the range of from about $-10°$ C. to about $50°$ C. A convenient reaction medium when the oxidant is hydrogen peroxide is a low molecular weight alcohol.

As illustrative of the first step of the process of this invention is the following:

Example I

To a suitable reaction vessel containing 50 parts by weight (substantially 0.169 mol) of dl-3-keto-17-formyl-$\Delta^{4,9(11),16}$-androstatriene (M. P. 178–178.5° C.) dissolved in 4200 parts by weight of methanol maintained at about 5° C. is added approximately 170 parts by weight of sodium carbonate as a 5% aqueous solution followed by a methanol-hydrogen peroxide mix containing approximately 5.7 parts by weight of hydrogen peroxide. The mix so obtained is stirred for about 16 hours at about 0° C. Thereupon substantially all of the methanol is removed by vacuum distillation and the residue is then taken up with chloroform. The chloroform solution is then washed with water and dried over anhydrous magnesium sulfate. Upon evaporation of the chloroform there is obtained a white solid residue, which upon triturating with diethyl ether yields white crystalline dl-3-keto-16,17-oxido-17-formyl-$\Delta^{4,9(11)}$-androstadiene.

Similarly the individual optically active isomers such as the natural modification of 3-keto-16,17-oxido-17-formyl-$\Delta^{4,9(11)}$-androstadiene are obtained beginning with the appropriate optically active isomer of 3-keto-17-formyl-$\Delta^{4,9(11),16}$-androstatriene. The natural modification of 3-keto-16,17-oxido-17-formyl-$\Delta^{4,9(11)}$-androstadiene is obtained employing the procedure of Example I but replacing dl-3-keto-17-formyl-$\Delta^{4,9(11),16}$-androstatriene with the dextro-rotatory form of 3-keto-17-formyl-$\Delta^{4,9(11),16}$-androstatriene (melting point 160.5–161.5° C.)

The next step in the process of this invention is the conversion of the formyl group, i. e. the substituent in the 17-position, to a carboxy group (Compound III of the schematic diagram). This is readily brought about employing a mild oxidizing agent such as silver oxide, sodium chromate in acetic acid, and the like. As illustrative of the preparation of a 3-keto-16,17-oxido-17-carboxy-$\Delta^{4,9(11)}$-androstadiene is the following:

Example II

To an intimate mixture containing approximately 200 parts by weight of dioxane, approximately 192 parts by weight of 2.74 N sodium hydroxide, and approximately 44.6 parts by weight of silver nitrate is slowly added approximately 40 parts by weight of dl-3-keto-16,17-oxido-17-formyl-$\Delta^{4,9(11)}$-androstadiene. Upon completion of the addition of the 16,17-oxido compound approximately 200 parts by weight of water and approximately 200 parts by weight of dioxane is added with constant agitation. Thereafter the mix is agitated for about one hour and is then filtered. The collected residue is washed with water and the washings combined with the original filtrate. The aqueous layer is acidified and then extracted with chloroform. The chloroform extracts are combined, dried and subjected to vacuum distillation. Upon evaporation of the chloroform there is obtained a solid residue which upon triturating with diethyl ether yields 35 parts by weight of crystalline dl-3-keto-16,17-oxido-17-carboxy-$\Delta^{4,9(11)}$-androstadiene.

Similarly the individual optically active isomers such as the natural modification of 3-keto-16,17-oxido-17-carboxy-$\Delta^{4,9(11)}$-androstadiene are obtained beginning with the appropriate optically active isomer of 3-keto-16,17-oxido-17-formyl-$\Delta^{4,9(11)}$-androstadiene.

The next step in the process of this invention the carboxylic acid (Compound III) is converted to its acid halide (Compound IV) employing an acyl halide forming agent such as oxalyl chloride and the like. As illustrative of the preparation of the acid halide (Compound IV) is the following:

Example III

To a solution containing approximately 50 parts by weight of dl-3-keto-16,17-oxido-17-carboxy - $\Delta^{4,9(11)}$ - androstadiene in approximately 4000 parts by weight of anhydrous methanol is added sufficient sodium methylate to neutralize the epoxy acid. The methanol is removed by vacuum distillation and to the residue is added and intimately mixed about 450 parts by weight of benzene and about 2.5 parts by weight of pyridine followed by about 250 parts by weight of oxalyl chloride while maintaining the temperature at about 10° C. The mix so obtained is allowed to stand for about 30 minutes, whereupon the mix is subjected to vacuum distillation while maintaining the temperature at about 15° C. The residue is then taken up with about 500 parts by weight of benzene and again subjected to vacuum distillation at about 15° C. The residue is taken up with about 250 parts by weight of benzene and filtered. Upon subjecting the filtrate to vacuum distillation there is obtained the solid acid chloride of dl-3-keto-16,17-oxido-17-carboxy-$\Delta^{4,9(11)}$-androstadiene.

Similarly the individual optically active isomers such as the acid chloride of the natural modification of 3-keto-16,17-oxido-17-carboxy-$\Delta^{4,9(11)}$-androstadiene are obtained from the appropriate optically active isomer.

The next step in the process of this invention is the preparation of the diazoketone (Compound V) by reacting diazomethane with an acid halide of a 16,17-oxido-17-carboxy - cyclopentano - 10,13 - dimethyl - $\Delta^{4,9(11)}$- decahydrophenanthren-3-one. Ordinarily an excess of two chemical equivalents of diazomethane is employed in converting the acid halide (Compound IV) to the diazoketone (Compound V) and in general the process is carried out in an inert organic solvent such as diethyl ether, benzene, dioxane, toluene, etc., at a temperature in the range of —20 to 40° C. As illustrative of the preparation of the diazoketone is the following:

Example IV

To a suitable reaction vessel containing an ether solution containing 100 parts by weight of diazomethane is added approximately 50 parts by weight of the acid chloride of dl-3-keto-16,17-oxido-17-carboxy-$\Delta^{4,9(11)}$-androstadiene dissolved in 500 parts by weight of benzene while maintaining the temperature at about 0° C. The mixture so obtained is then agitated for about one hour at about 0° C. The mix is then subjected to vacuum distillation to remove the solvents whereupon there is obtained yellow crystalline dl-3,20-diketo-16,17-oxido-21-diazo-$\Delta^{4,9(11)}$-pregnadiene.

Similarly the individual optically active isomers such as the natural modification of 3,20-diketo-16,17-oxido-21-diazo-$\Delta^{4,9(11)}$-pregnadiene are obtained beginning with the acid halide of the appropriate optically active isomer of 3-keto-16,17-oxido-17-carboxy-$\Delta^{4,9(11)}$-androstadiene.

The next step in the process of this invention is the formation of the 17-(acyloxyacetyl)-16,17-oxido-cyclopentano - 10,13 - dimethyl - $\Delta^{4,9(11)}$- decahydrophenanthren-3-one (Compound VI) from the diazoketone (Compound V) by heating the latter in the presence of a monocarboxylic acid such as acetic acid, propionic acid, butyric acid, valeric acid, caproic acid, lauric acid, stearic acid, phenylacetic acid, β-phenylpropionic acid, benzoic acid, toluic acid, etc., in the presence where desirable of an inert organic solvent such as benzene, toluene, xylene, dioxane, etc. It is preferred that the carboxylic acid be a fatty acid and preferably one containing from 2 to 4 carbon atoms. As illustrative of this step is the following:

Example V

To a suitable reaction vessel containing approximately 5000 parts by weight of acetic acid is added approximately 50 parts by weight of dl-3,20-diketo-16,17-oxido-21-diazo-$\Delta^{4,9(11)}$-pregnadiene and the mix so obtained heated at about 90–95° C. for about 30 minutes. The resultant mix is then subjected to vacuum distillation and the residue so obtained taken up with chloroform. The chloroform solution is then washed with aqueous sodium bicarbonate, then with water and finally dried. Upon removal of the solvent there is obtained solid dl-3,20-diketo-16,17-oxido-21-acetyloxy-$\Delta^{4,9(11)}$-pregnadiene in the form of white crystals.

Similarly the individual optically active isomers such as the natural modification of 3,20-diketo-16,17-oxido-21-acetyloxy-$\Delta^{4,9(11)}$-pregnadiene are obtained from the appropriate optically active isomer of 3,20-diketo-16,17-oxido-21-diazo-$\Delta^{4,9(11)}$-pregnadiene.

The next step of the process of this invention is the opening of the epoxide grouping by reacting the 17 - (acyloxyacetyl) - 16,17 - oxido - cyclopentano - 10,13-dimethyl - $\Delta^{4,9(11)}$ - decahydrophenanthren - 3 - one (Compound VI) with a hydrogen halide such as HCl, HBr or HI which results in the formation of a halohydrin (Compound VII), namely 16-halo-17-hydroxy-17-(acyloxyacetyl)-cyclopentano-10,13-dimethyl-$\Delta^{4,9(11)}$-decahydrophenanthren-3-one. This reaction is preferably carried out in an inert organic solvent containing dissolved therein the hydrogen halide reactant and at a temperature in the range of about —20° C. to about 40° C. As illustrative of this step is the following:

Example VI

Approximately 40 parts by weight of dl-3,20-diketo-16,17-oxido-21-acetyloxy-$\Delta^{4,9(11)}$-pregnadiene is admixed with approximately 3000 parts by weight of acetic acid and approximately 1000 parts by weight of benzene in a suitable reaction vessel. Thereto is added while maintaining the temperature at about 0° C. approximately 80 parts by weight of a 38% acetic acid solution of hydrogen bromide and the mix so obtained agitated for about 30 minutes at about 0° C. To the mix is then added an equal volume of water and the composite so obtained extracted with several small portions of chloroform. The chloroform extracts are combined, washed with water and dried over anhydrous magnesium sulfate. Upon subjecting the so dried solution to vacuum distillation in order to remove the chloroform there is obtained white crystalline dl-3,20-diketo-16β-bromo-17α-hydroxy-21-acetyloxy-$\Delta^{4,9(11)}$-pregnadiene.

In a similar fashion but employing hydrogen chloride instead of hydrogen bromide white crystalline dl-3,20-diketo-16β-chloro-17α-hydroxy-21-acetyloxy-$\Delta^{4,9(11)}$-pregnadiene is obtained from dl-3,20-diketo-16,17-oxido-21-acetyloxy-$\Delta^{4,9(11)}$-pregnadiene.

Similarly the individual optically active isomers such as the natural modification of 3,20-diketo-16β-bromo-17α-hydroxy-21-acetyloxy-$\Delta^{4,9(11)}$-pregnadiene are obtained from the appropriate optically active isomer of 3,20-diketo-16,17-oxido-21-acetyloxy-$\Delta^{4,9(11)}$-pregnadiene.

The next step in the process of this invention is the reacting of the 16-halo-17-hydroxy compound (Compound VII) with a hypohalous acid to form the 9,16-dihalo-11,17 - dihydroxy-17-(acyloxyacetyl)-cyclopentano-10,13-dimethyl - $\Delta^4$ - dodecahydrophenanthren-3-one (Compound VIII). The addition reaction is brought about by mixing a solution of a hypohalous acid, preferably hypobromous acid, with a solution of a 16-halo-17-hydroxy-17-(acyloxyacetyl) - cyclopentano-10,13-dimethyl-$\Delta^{4,9(11)}$-decahydrophenanthren-3-one at a temperature in the range of about 0 to 30° C. The 9-halo and 11-hydroxy substituents so introduced bear a trans relationship to one another, that is one occupies the plane above ring C while the other occupies the plane below ring C, however, it is to be understood that the element of this invention is not limited to any assumption as to chemical structure but pertains broadly to the 9-halo-11-hydroxy addition product of a hypohalous acid and a 16-halo-17-hydroxy-17-(acyloxyacetyl)-cyclopentano-10,13-dimethyl-$\Delta^{4,9(11)}$-decahydrophenanthren-3-one (Compound VII). Various solvents which are inert under conditions of the addition reaction may be used in the preparation of the 9-halo-11-hydroxy addition product (Compound VIII), for example acetone, methyl ethyl ketone, methyl acetate, ethyl acetate, tert. butanol, etc.

In this step of the process of this invention it is preferred that the hypohalous acid employed be hypobromous acid and such can be prepared in several ways, for example by mixing mercuric oxide with bromide and water and filtering off the mercuric bromide thus formed, or by mixing N-bromoacetamide with water and tertiary butanol or, preferably, by mixing a solution of N-bromosuccinimide

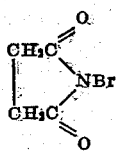

in a suitable inert organic solvent, e. g. acetone, tertiary butanol, with water and a small amount of sulfuric acid. Where desired the hypobromous acid solution can be prepared first and then mixed with 16-halo-17-hydroxy-17-(acyloxyacetyl)-cyclopentano-10,13-dimethyl-$\Delta^{4,9(11)}$-decahydrophenanthren-3-one (Compound VII) or, preferably, the hypobromous acid is prepared in the presence of the reactant (i. e. Compound VII) so that the elements of hypobromous acid add to the 9–11 double bond as soon as they are formed. As illustrative of this step of the process of this invention employing hypobromous acid is the following:

*Example VII*

To an agitating solution containing substantially 63 parts by weight of $dl$-3,20-diketo-16$\beta$-bromo-17$\alpha$-hydroxy-21-acetyloxy-$\Delta^{4,9(11)}$-pregnadiene, substantially 2800 parts by weight of acetone and substantially 1200 parts by weight of water is added at about 0–5° C. approximately 50 parts by weight of 1 N sulfuric acid. To the so cooled and acidified solution is slowly added a solution containing substantially 35 parts by weight of N-bromosuccinimide in approximately 360 parts by weight of acetone. Upon completion of the N-bromo-succinimide addition the mix is agitated for about 5 hours at about 0–5° C., the bromo-hydrin crystallizes from the solution during the agitation. At the end of the agitation period aqueous sodium sulfite is added to destroy the excess N-bromo-succinimide and then the mix is neutralized with sodium bicarbonate. The mix is filtered and the residue washed first with water, then with acetone and dried. The white crystalline product so obtained is $dl$-3,20-diketo-9$\alpha$,17$\beta$-dibromo-11$\beta$,17$\alpha$-dihydroxy-21-acetyloxy-$\Delta^4$-pregnene.

In a similar fashion beginning with $dl$-3,20-diketo-16$\beta$-chloro-17$\alpha$-hydroxy-21-acetyloxy-$\Delta^{4,9(11)}$-pregnadiene white crystalline $dl$-3,20-diketo-9$\alpha$-bromo-16$\beta$-chloro-11$\beta$,17$\alpha$-dihydroxy-21-acetyloxy-$\Delta^4$-pregnene is obtained.

$dl$-3,20-diketo-9$\alpha$,16$\beta$-dichloro-11$\beta$,17$\alpha$-dihydroxy-21-acetyloxy-$\Delta^4$-pregnene may be prepared by admixing the 9$\alpha$-bromo-11$\beta$-hydroxy compound (i. e. the product of Example VII) with a small amount of potassium acetate and boiling the mix in alcohol to effect formation of the 9-11,16-17 dioxido derivative, the dioxido compound so obtained upon reacting with hydrochloric acid in chloroform at about 0–5° C. yields $dl$-3,20-diketo-9$\alpha$,16$\beta$-dichloro-11$\beta$,17$\alpha$-dihydroxy-21-acetyloxy-$\Delta^4$-pregnene.

Similarly the individual optically active isomers of 3,20-diketo-9$\alpha$,16$\beta$-dihalo-11$\beta$,17$\alpha$-dihydroxy-21-acetyloxy-$\Delta^4$-pregnene, e. g. the natural modification of 3,20 diketo-9$\alpha$,16$\beta$-dibromo-11$\beta$,17$\alpha$-dihydroxy-21-acetyloxy-$\Delta^4$-pregnene are obtained from the appropriate optically active 3,20-diketo-16$\beta$-halo-17$\alpha$-hydroxy-21-acetyloxy-$\Delta^{4,9(11)}$-pregnadiene.

The next step in the process of this invention is the oxidation of the 11-hydroxy substituent of Compound VIII of the foregoing schematic diagram to produce the 16-halo-17-hydroxy-17-(acyloxyacetyl)-cyclopentano-9-halo-10,13-dimethyl-$\Delta^4$-dodecahydrophenanthren-3,11-dione (Compound IX)

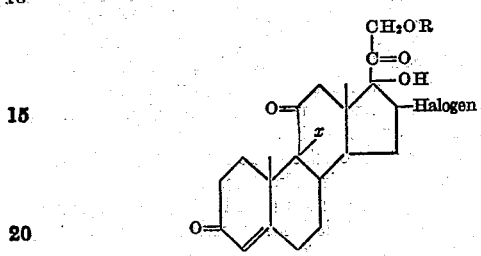

where $x$ is a halogen atom such as bromine, chlorine and iodine and where R is an acyl radical derived from a hydrocarbon monocarboxylic acid. This oxidation step is brought about in an anhydrous system by mixing a complex of chromium oxide and a tertiary amine, such as pyridine or the various picolines, etc., with the 9-halo-11-hydroxy compound (Compound VIII). As illustrative of this step of the process of this invention is the following:

*Example VIII*

To an agitated complex of chromium trioxide and pyridine prepared in the cold by admixing 50 parts by weight of chromium trioxide with 500 parts by weight of pyridine is added substantially 50 parts by weight of $dl$-3,20-diketo-9,16-dibromo-11$\beta$,17$\alpha$-dihydroxy-21-acetyloxy-$\Delta^4$-pregnene in approximately 800 parts by weight of pyridine while maintaining the temperature at about 10° C. The mixture so obtained is permitted to stand at room temperature for about 16 hours with occasional agitation. The mixture is then filtered and the residue washed with pyridine. The pyridine wash and the original filtrate are combined and the solution so formed is poured into five times its weight of water and the composite extracted with chloroform. The extracts are combined and cooled to about 0° C. The cooled solution is then washed with dilute hydrochloric acid and then with water. The organic layer is recovered, dried, and evaporated to dryness. The residue is white crystalline $dl$-3,11,20-triketo-9$\alpha$,16$\beta$-dibromo-17$\alpha$-hydroxy-21-acetyloxy-$\Delta^4$-pregnene.

Replacing $dl$-3,20-diketo-9$\alpha$,16$\beta$-dibromo-11$\beta$,17$\alpha$-dihydroxy-21-acetyloxy-$\Delta^4$-pregnene in Example VIII with an equal weight of $dl$-3,20-diketo-9$\alpha$,16$\beta$-dichloro-11$\beta$,17$\alpha$-dihydroxy-21-acetyloxy-$\Delta^4$-pregnene and subjecting same to the series of steps set forth in Example VIII $dl$-3,11,20-triketo-9$\alpha$,16$\beta$-dichloro-17$\alpha$-hydroxy-21-acetyloxy-$\Delta^4$-pregnene is obtained.

In a similar fashion the individual optically active isomers of 3,11,20-triketo-9$\alpha$,16$\beta$-dihalo-17$\alpha$-hydroxy-21-acetyloxy-$\Delta^4$-pregnene, e. g. the natural modification of 3,11,20-triketo-9$\alpha$,16$\beta$-dibromo-17$\alpha$-hydroxy-21-acetyloxy-$\Delta^4$-pregnene is obtained from the appropriate optically active 3,20-diketo-9$\alpha$,16$\beta$-dihalo-11$\beta$,17$\alpha$-dihydroxy-21-acetyloxy-$\Delta^4$-pregnene.

The next step in the process of this invention is the removal of the 9-halogen and 16-halogen substituents on the 16-halo-17-hydroxy-17-(acyloxyacetyl)-cyclopentano-9-halo-10,13-dimethyl-$\Delta^4$-dodecahydrophenanthren-3,11-dione. In this step the halogen substituent in the 9-position is removed first to provide a 16-halo-17-hydroxy-17-(acyloxyacetyl)-cyclopentano-10, 13 - dimethyl - Δ⁴ - dodecahydrophenanthren - 3,11-dione (Compound X) which compound upon dehalogenating produces a 17-hydroxy-17-(acyloxyacetyl)-cyclopentano - 10,13 - dimethyl - Δ⁴ - dodecahydrophenanthren-3,11-dione (Compound XI). It is preferred to remove both halogen substituents in one operation and as illustrative of this employing a large excess of Raney nickel is the following:

Example IX

To a suitable reaction vessel containing 20 parts by weight of Raney nickel, approximately 200 parts by weight of acetone and about 20 parts by weight of water is added approximately 3.5 parts by weight of dl - 3,11,20 - triketo - 9α,16β - dibromo - 17α - hydroxy-21-acetyloxy-Δ⁴-pregnene and the mixture so obtained refluxed in an atmosphere of nitrogen for about 4 hours. The reaction mix is then filtered and the residue washed with warm acetone. The washings and original filtrate are combined and subjected to vacuum distillation. The residue is then taken up with chloroform and the solution so formed washed with water and dried. The dried solution is then subjected to vacuum distillation whereupon there is obtained white crystalline dl-3,11,20-triketo-17α-hydroxy-21-acetyloxy-Δ⁴-pregnene (M. P. 240–243° C.) which compound is identical with the acetate of racemic (dl) cortisone.

Similarly the individual optically active isomers such as the natural modification (dextro-rotary form) of 3,11,20 - triketo - 17α - hydroxy - 21 - acetyloxy - Δ⁴-pregnene are obtained beginning with the appropriate optically active isomers of 3,11,20-triketo-9α,16β-dibromo-17α-hydroxy-21-acetyloxy-Δ⁴-pregnene. The 21-acyl derivative of the natural modification of 3,11,20-triketo-17α,21-dihydroxy-Δ⁴-pregnene according to infrared spectrum, melting point and optical rotation is identical with the corresponding acyl derivative of natural cortisone. Thusly, it is to be understood that the optically active isomers referred to hereinbefore as the "natural modification" are those which through the course of reactions as afore schematically outlined starting with the dextro-rotary form of 3-keto-17-formyl-Δ⁴,⁹⁽¹¹⁾,¹⁶-androstatriene provide for the acyl derivatives of natural cortisone.

While as aforedescribed the 16-halo-17-hydroxy-17-(acyloxyacetyl) - cyclopentano - 10,13 - dimethyl-Δ⁴,⁹⁽¹¹⁾-decahydrophenanthren-3-one compound (Compound VII) was employed to prepare the 9-halo-11-hydroxy addition product (Compound VIII) it has been found that it (i. e. Compound VII) upon dehalogenating provides for a 17-hydroxy-17-(acyloxyacetyl)-cyclopentano - 10,13 - dimethyl - Δ⁴,⁹⁽¹¹⁾-decahydrophenanthren-3-one which compound upon reacting with a hypohalous acid produces a 9-halo-11-hydroxy addition product which addition product upon dehalogenating yields a 11,17 - dihydroxy - 17 - (acyloxyacetyl) - cyclopentano-10,13 - dimethyl - Δ⁴ - dodecahydrophenanthren - 3 - one. This sequence of steps is outlined schematically as follows, R and x having the same significance as aforedescribed.

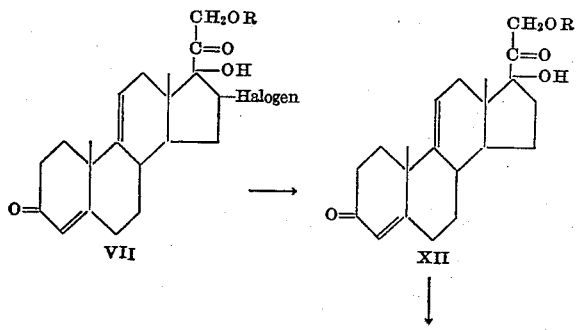

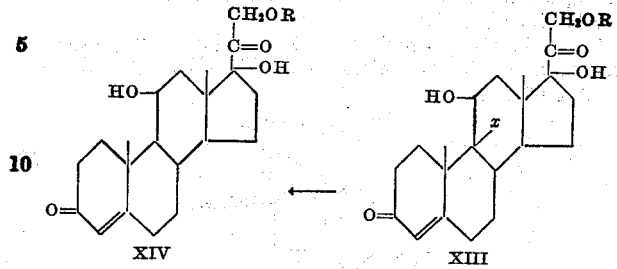

As illustrative these steps proceeding from Compound VII to Compounds XII and XIII and finally to Compound XIV is the following:

Example X

To a suitable reaction vessel containing 10 parts by weight of Raney nickel, approximately 100 parts by weight of acetone and about 10 parts by weight of water is added and intimately mixed 3 parts by weight of dl - 3,20 - diketo - 16β - bromo - 17α - hydroxy - 21-acetyloxy-Δ⁴,⁹⁽¹¹⁾-pregnadiene and the mixture so obtained refluxed in an atmosphere of nitrogen for about 4 hours. The reaction mix is then filtered and the residue washed with warm acetone. The washings and original filtrate are combined and subjected to vacuum distillation. The residue is then taken up with chloroform and the solution so formed washed with water and dried. The dried solution is then subjected to vacuum distillation whereupon there is obtained white crystalline dl-3,20-diketo-17α-hydroxy-21-acetyloxy-β-4,9⁽¹¹⁾-pregnadiene.

Similarly the individual optically active isomers such as the natural modification of 3,20-diketo-17α-hydroxy-21-acetyloxy-Δ⁴,⁹⁽¹¹⁾-pregnadiene are obtained beginning with the appropriate optically active isomer of 3,20-diketo - 16β - bromo - 17α - hydroxy - 21 - acetyloxy-Δ⁴,⁹⁽¹¹⁾-pregnadiene. The natural modification or dextrorotatory form of 3,20-diketo-17α-hydroxy-21-acetyloxy-Δ⁴,⁹⁽¹¹⁾-pregnadiene possesses a melting point of 233–236° C.

The aforedescribed dl - 3,20 - diketo - 17α - hydroxy-21 - acetyloxy - Δ⁴,⁹⁽¹¹⁾-pregnadiene upon reacting with a hypohalous acid such as hypobromous acid in accordance with the process of Example VII produces white crystalline dl - 3,20 - diketo - 9α - bromo - 11β,17α-dihydroxy-21-acetyloxy-Δ⁴-pregnene which 9-bromo-11-hydroxy addition product upon dehalogenating using Raney nickel provides for dl-3,20-diketo-11β,17α-dihydroxy-21-acetyloxy-Δ⁴-pregnene which compound has the same infrared spectrum as the (21-) acetate of 17-hydroxy corticosterone. Similarly but beginning with the natural modification of 3,20-diketo-17α-hydroxy-21-acetyloxy-Δ⁴,⁹⁽¹¹⁾-pregnadiene the acetate obtained is identical with the (21-) acetate of 17-hydroxy corticosterone.

The natural modification of 3-keto-16,17-oxido-17-formyl-Δ⁴,⁹⁽¹¹⁾-androstadiene referred to in column 4, lines 31ff. is a white crystalline substance melting at 193–197° C. The natural modification of 3-keto-16,17-oxido-17-carboxy-Δ⁴,⁹⁽¹¹⁾-androstadiene referred to in column 4, lines 65ff. is a white crystalline substance melting at 211–212° C. The natural modification of 3,20-diketo-16,17-oxido-21-diazo-Δ⁴,⁹⁽¹¹⁾-pregnadiene referred to in column 5, lines 52ff., is a yellow crystalline substance melting at 165–168° C. The natural modification of 3,20-diketo-16β-bromo-17α-hydroxy-21-acetyloxy-Δ⁴,⁹⁽¹¹⁾-pregnadiene referred to in column 6, lines 51ff., is a white crystalline substance melting at 146–148° C.

This application is a division of co-pending application Serial No. 369,944, filed July 23, 1953, now U. S. Patent No. 2,759,929.

While this invention has been described with respect to certain embodiments it is not so limited and it is to be understood that variations and modifications thereof obvious to those skilled in the art may be made without departing from the spirit or scope of this invention.

What is claimed is:

1. 16 - halo - 17 - hydroxy - 17 - (acyloxyacetyl) - cyclopentano - 10,13 - dimethyl - $\Delta^{4,9(11)}$ - decahydrophenanthren-3-one

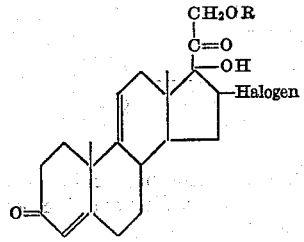

where R is an acyl radical obtained from a hydrocarbon monocarboxylic acid.

2. The compound of claim 1 where the 16-halogen substituent is bromine and where R is an acyl radical obtained from a fatty acid containing 2 to 4 carbon atoms.

3. 16 - halo - 17 - hydroxy - 17 - (acyloxyacetyl) - cyclopentano - 9 - halo - 11 - hydroxy - 10,13 - dimethyl-$\Delta^4$-dodecahydrophenanthren-3-one

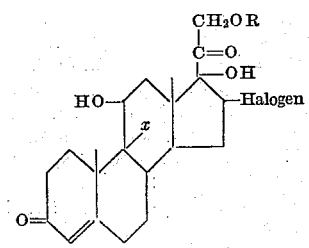

where $x$ is a halogen atom having an atomic weight greater than 19.00 and where R is an acyl radical obtained from a hydrocarbon mono-carboxylic acid.

4. The compound of claim 3 wherein the 16-halogen substituent and $x$ are bromine atoms and where R is an acyl radical obtained from a fatty acid containing 2 to 4 carbon atoms.

5. 16 - halo - 17 - hydroxy - 17 - (acyloxyacetyl) - cyclopentano - 9 - halo - 10,13 - dimethyl - $\Delta^4$ - dodecahydrophenanthren-3,11-dione

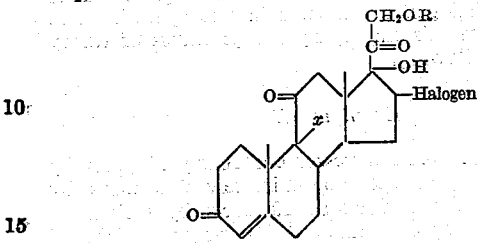

where $x$ is a halogen atom having an atomic weight greater than 19.00 and where R is an acyl radical obtained from a hydrocarbon mono-carboxylic acid.

6. The compound of claim 5 wherein the 16-halogen substituent and $x$ are bromine atoms and where R is an acyl radical obtained from a fatty acid containing 2 to 4 carbon atoms.

7. 3,20 - diketo - 16$\beta$ - bromo - 17$\alpha$ - hydroxy - 21-acetyloxy-$\Delta^{4,9(11)}$-pregnadiene.

8. 3,20 - diketo - 9,16$\beta$ - dibromo - 11,17$\alpha$ - dihydroxy-21-acetyloxy-$\Delta$-pregnene.

9. 3,20 - diketo - 9$\alpha$,16$\beta$ - dibromo - 11$\beta$,17$\alpha$ - dihydroxy-21-acetyloxy-$\Delta^4$-pregnene.

10. 3,11,20 - triketo - 9$\alpha$,16$\beta$ - dibromo - 17$\alpha$ -hydroxy-21-acetyloxy-$\Delta^4$-pregnene.

References Cited in the file of this patent
UNITED STATES PATENTS

| | | |
|---|---|---|
| 2,602,804 | Kendall | July 8, 1952 |
| 2,703,799 | Bergstrom | Mar. 8, 1955 |
| 2,705,711 | Dodson | Apr. 5, 1955 |
| 2,707,190 | Farrar | Apr. 26, 1955 |
| 2,733,240 | Rosenkranz | Jan. 31, 1956 |
| 2,745,850 | Farrar | May 15, 1956 |
| 2,759,928 | Farrar | Aug. 21, 1956 |
| 2,759,929 | Farrar | Aug. 21, 1956 |